United States Patent [19]

Jin

[11] Patent Number: 5,508,069
[45] Date of Patent: Apr. 16, 1996

[54] LIQUID CRYSTAL DISPLAY DEVICE

[75] Inventor: Sung-ho Jin, Suwon, Rep. of Korea

[73] Assignee: Samsung Display Devices Co., Ltd., Kyungki, Rep. of Korea

[21] Appl. No.: 366,900

[22] Filed: Dec. 30, 1994

[30] Foreign Application Priority Data

May 31, 1994 [KR] Rep. of Korea ............... 94-12220

[51] Int. Cl.$^6$ .................................................. G02F 1/1337
[52] U.S. Cl. ................................................ 428/1; 359/75
[58] Field of Search ................................. 428/1; 359/75, 359/76, 77, 78

Primary Examiner—Alexander S. Thomas
Attorney, Agent, or Firm—Rothwell, Figg, Ernst & Kurz

[57] ABSTRACT

A liquid crystal display device includes a fully aromatic thermotropic polyester organic polymer having a similar structure as that of a low-molecular-weight liquid crystal material as an orientation film, in order to control the uniform orientation of the liquid crystal. The polyester adopted as the orientation film is coated as a uniform film having a few pin holes or damages and is stable against oxygen in the air, moisture or chemicals, and particularly, the adhesiveness to the substrate is excellent. The liquid crystal display device adapting a fully aromatic thermotropic polyester organic polymer as an orientation film exhibits orientation characteristics and display characteristics.

2 Claims, 7 Drawing Sheets

LIQUID CRYSTAL DISPLAY DEVICE

FIELD OF THE INVENTION

The present invention relates to a liquid crystal display device having a fully aromatic thermotropic polyester organic polymer as an orientation film.

BACKGROUND OF THE INVENTION

In general, the physical property of liquid crystal varies according to the state of the molecular alignment. As a result, response characteristic of liquid crystal with respect to external factors such as an electric field also vary considerably. Thus, it becomes an important technology to control the orientation of the liquid crystal uniformly in manufacturing liquid crystal devices. Many studies have been vigorously conducted to this end.

The uniform alignment of the molecules of the liquid crystals is difficult to obtain by merely injecting the liquid crystal between upper and lower substrates. Therefore, for uniform orientation, an orientation film is generally provided between the substrates for uniform orientation.

As the orientation method for liquid crystal, the molecular alignment is controlled by gradient vapor depositing inorganic materials (mainly, silicone oxide) without using rubbing treatment. The method using inorganic material, however, is being considered only in laboratory scale because large scale production is difficult due to the spatial non-uniformity and the low productivity thereof is not suitable for mass production. Therefore, organic orientation films obtained by coating an organic polymer, followed by rubbing with a piece of cloth are generally used. Among organic polymers, polyimides have been mainly used in consideration of the requirements for orientation films, such as efficiency in mass production, orientation efficiency for liquid crystal molecules and resistance to unfavorable environment.

However, the typical polyimide orientation materials have several disadvantages.

First, since highly pure monomer and solvent are necessary to synthesize polyamic acids (PA) which are precursors of polyimides, synthesis is difficult and costly.

Second, the solvent N-methyl-2-pyrrolidone (NMP) is highly hygroscopic and the above polyamic acids are degraded by water. Therefore, when PA is used or stored in an open system for a long period, its molecular weight decreases, thereby resulting in change in their physical properties.

Third, although inferior coating characteristics due to high surface tension of NMP are improved using a solvent having a low surface tension, i.e., butylcellosolve, it is still difficult to obtain a uniformly thin film of 600Å or less.

Fourth, in the case of polyamic acids, siloxane groups are incorporated in a polymer frame or a silane coupling agent for improving the adhesiveness to the substrate and a system added with a metal complex is used for regulating the contacting angle between liquid crystal and orientation film. Thus, uniform orientation control is hard to accomplish. Also, it is difficult to evaluate the affect of the interaction between molecular structures of liquid crystal and orientation agent on the molecular alignment, thereby making it difficult to select and design the liquid crystal and orientation agent efficiently.

Fifth, orientation characteristics of conventional orientation materials are liable to be changed by changes in device manufacturing conditions such as curing temperature or orientation conditions.

Sixth, specifically in the case of surface stabilized ferroelectric liquid crystal devices, since liquid crystal materials having a chiral smectic phase C (SmC) are used, if liquid crystal is injected in an isotropic phase and then the temperature is lowered, the liquid crystal becomes a smectic phase A having a layer structure perpendicular to the rubbing direction via a chiral nematic phase N and is again changed into the chiral smectic phase C so that the molecules within the layer are tilted at a specific angle with respect to the rubbing direction. At this time, as the gap between the smectic layers becomes reduced, bends in the smectic layers occur in order to compensate for the change of volume. This bent layer structure is called a chevron. Domains having different liquid crystal orientation are formed according to the directions of the bends. The non-uniform orientation is achieved where "zigzag," "hair-pin" or "mountain" damage is present on the boundary surface. As the result, the contrast ratio is lowered and a device of inferior bistability is obtained.

In order to solve such problems, improved orientation materials ('92 *Japan Display*, p579; and *Liquid Crystal*, Vol. 13, 1993), improved orientation treatment (*SID '93 Digest*, p364), improved liquid crystal materials ('92 *Japan Display*, p575), or orientation stabilization by an electric field (*Japanese Journal of Applied Physics*, Vol. 28, L119, 1989; and *SID '91 Digest*, p400) have been applied.

Also, in order to improve the bistability, which is one of the most important characteristics of a ferroelectric liquid crystal device, there have been known methods for using a conductive orientation film ('91 *SID Digest*), the orientation film to which a conductive complex is added, an LB PI orientation film (*SID Proceedings*, Vol. 30/4, 1989), and the liquid crystal to which a conductive complex is added. However, these methods have various drawbacks in terms of shorts, orientation efficiency or mass production.

SUMMARY OF THE INVENTION

To solve the above described problems, it is an object of the present invention to provide a liquid crystal display device whose display characteristics and productivity have been improved by using a new, fully aromatic thermotropic organic polyester polymer as the orientation film, instead of the conventional polyimides, for controlling the liquid crystal, orientation material and orientation characteristics.

To accomplish the above object, the present invention provides a liquid crystal display device comprising a pair of upper and lower substrates, transparent electrodes formed on the respective substrates, orientation films formed on the respective transparent electrodes and rubbed in a predetermined direction, and liquid crystal injected between the orientation films, the orientation films comprising a fully aromatic thermotropic high-molecular-weight polyester represented by the formula (I).

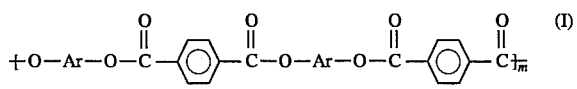

Here, Ar is an aromatic group, and m is a positive integer.

The aromatic group is preferably one among the following groups.

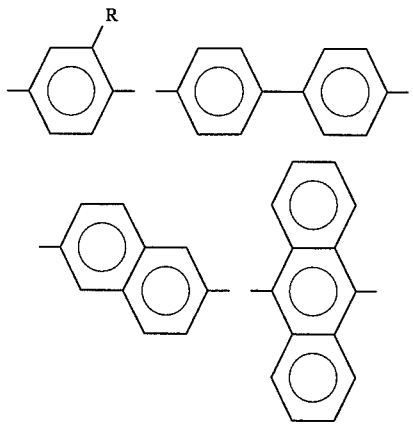

Here, R is selected from among the halogen group such as Cl or Br, $(CH_2-)_xH$, $CH_3$ and hydrogen, and x is an integer preferably from 0 to 10.

The above object is also accomplished by a liquid crystal display device according to the present invention comprising a pair of upper and lower substrates, transparent electrodes formed on the respective substrates, orientation films formed on the respective transparent electrodes and rubbed in a predetermined direction, and liquid crystal injected between the orientation films, the orientation films comprising thermotropic polyester copolymers represented by the formula (II).

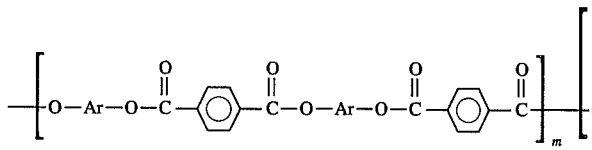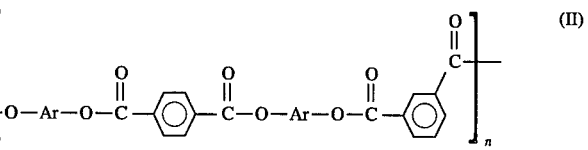

Here, Ar is an aromatic group, n is positive integer and m is a positive integer.

The aromatic group is preferably one among the following groups.

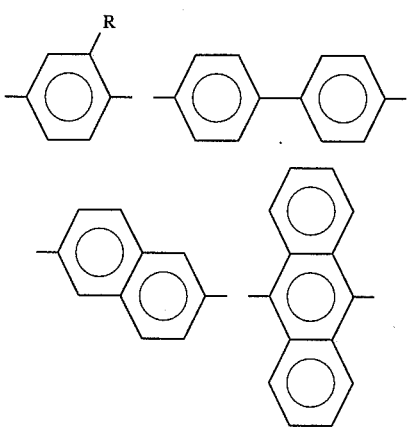

Here, R is selected from among the halogen group such as Cl or Br, $(CH_2-)_xH$, $CH_3$ and hydrogen, and x is an integer preferably from 0 to 10.

BRIEF DESCRIPTION OF THE DRAWINGS

The above objects and advantages of the present invention will become more apparent by describing in detail preferred embodiments thereof with reference to the attached drawings in which:

FIGS. 5A and 5B are orientation state diagrams of the liquid crystal display device using a conventional RN-715 as an orientation material, wherein FIG. 5A shows the previous state of electric field stabilization and FIG. 5B shows the orientation state after performing an electric field stabilization using a square waveform of 20 volts;

FIGS. 6A and 6B are liquid crystal orientation state diagrams of the liquid crystal display device manufactured according to still another embodiment of the present invention, wherein FIG. 6A shows the previous state of electric field stabilization and FIG. 6B shows the orientation state after performing an electric field stabilization using a square waveform of 20 volts.

DETAILED DESCRIPTION OF THE INVENTION

Figure 1:
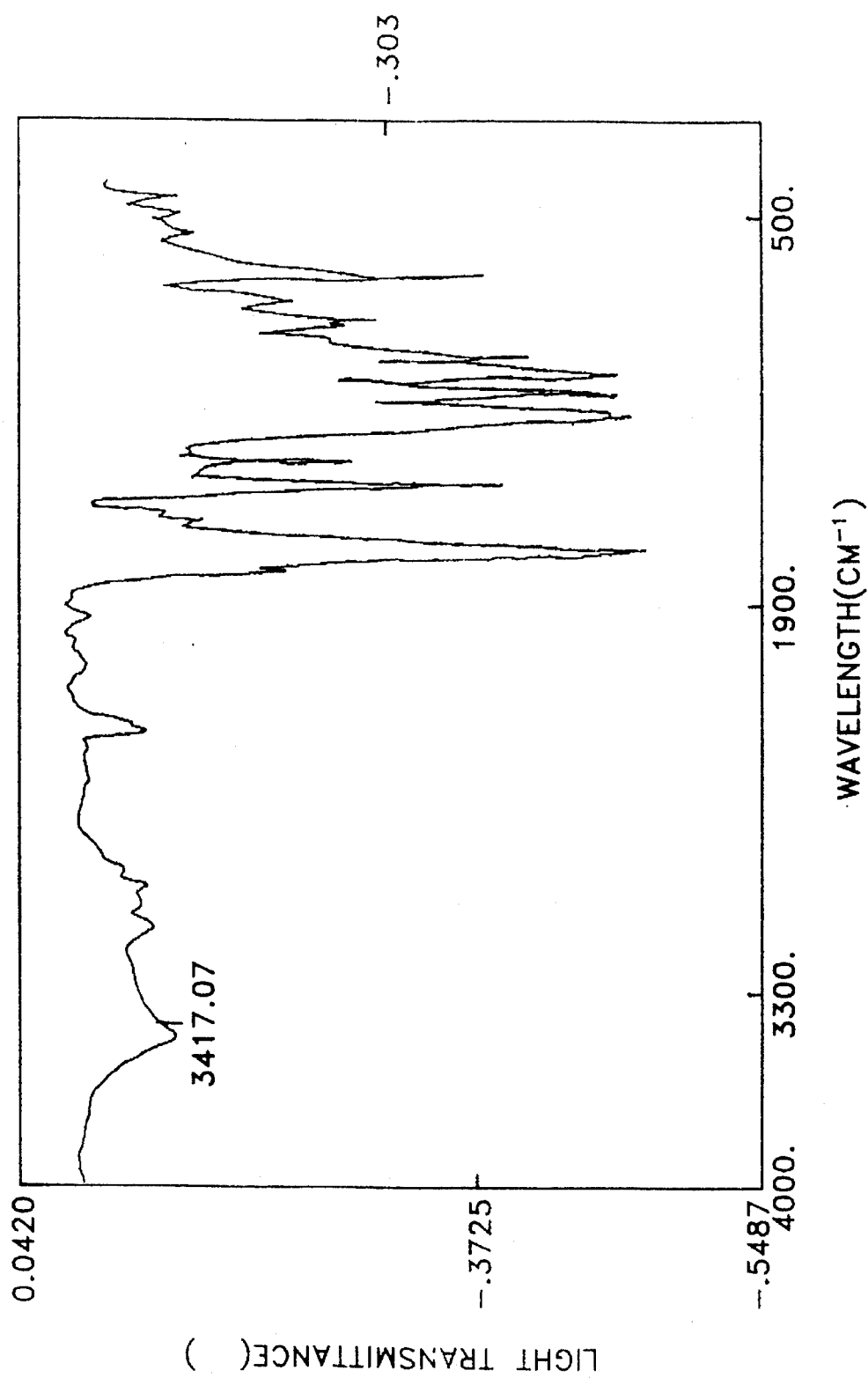
FIG. 1 is an infrared (IR) spectral diagram of a fully aromatic polyester monomer (BHT-TP) formed according to an embodiment of the present invention.

The fully aromatic thermotropic liquid crystal polyester represented by the formulae (I) and (II) has a similar structure to that of low-molecular weight liquid crystals. Thus, the orientation of the low-molecular weight liquid crystals can be controlled efficiently. The synthesis and manufacturing process is achieved by the following steps.

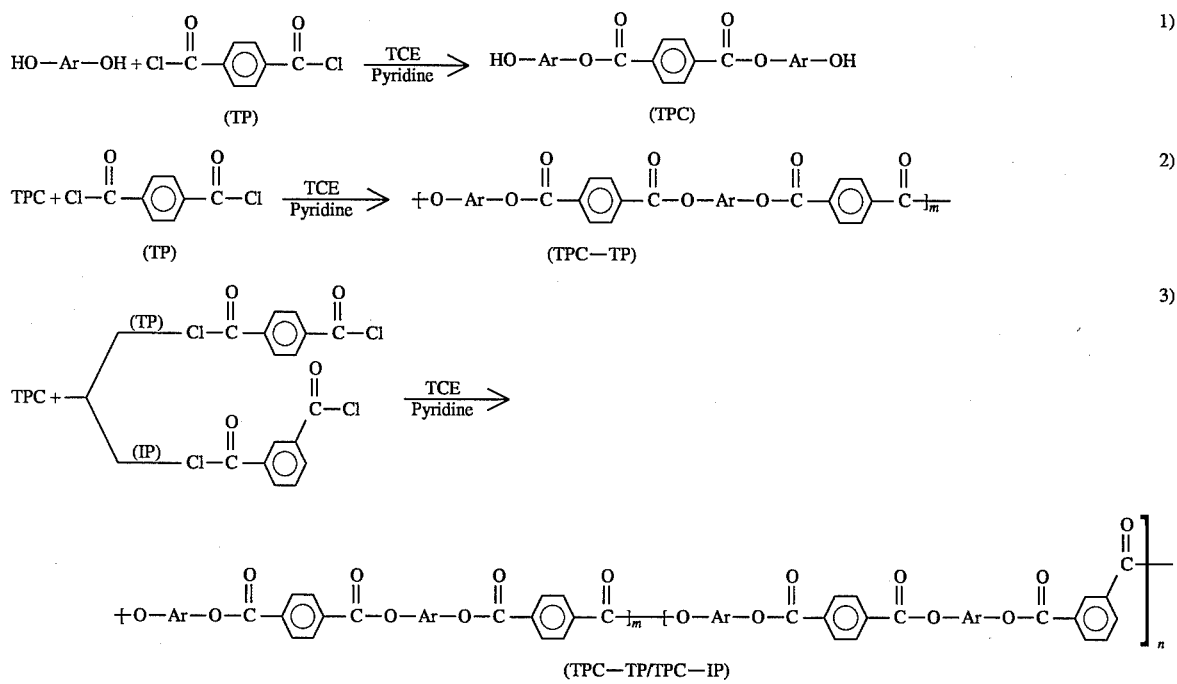

In a first step, an aromatic compound having two hydroxyl groups is dissolved in 1,1,2,2-tetrachloroethane (TCE) and pyridine, and terephthaloyl chloride solution is added thereto and stirred. Subsequently, water is added to the reaction mixture. The thus-formed solid precipitate is filtered, to thereby obtain a terephthalate compound (TPC).

In a second step, the terephthalate compound (TPC) obtained in the first step is dissolved in TCE and pyridine, and then terephthaloyl chloride solution is added dropwisely thereto and the reaction mixture is stirred. Thereafter, the solution is diluted, filtered and dried, to obtain a fully aromatic thermotropic liquid crystal polyester (TPC-TP) represented by a general formula (I).

In a third step, the terephthalate compound (TPC) obtained in the first step is dissolved in TCE and pyridine, and then terephthaloyl chloride (TP) solution and isophthaloyl chloride (ZP) solution are simultaneously added dropwisely thereto, and the reaction mixture is stirred. Thereafter, the solution is diluted, filtered and dried, to obtain a fully aromatic thermotropic liquid crystal polyester copolymer (TPC-TP/TPC-IP) represented by a general formula (II).

The fully aromatic thermotropic liquid crystal polyester manufactured by the above described steps, which are represented by the formulae (I) and (II), can be dissolved in an organic solvent such as p-chlorophenol, o-chlorophenol or dimethylform amide, and has a good producibility, excellent environmental resistance, i.e., heat-resistance, moisture-resistance or chemical-resistance, and excellent adhesiveness so as to be used as an orientation material after a heat treatment.

The fully aromatic thermotropic polyester manufactured by the aforementioned manufacturing process has the following inherent characteristics.

First, it can be manufactured simply and cost-efficiently.

Second, it is soluble in an organic solvent such as p-chlorophenol, o-chlorophenol or dimethylform amide and is stable against water such that it is not decomposed thereby. Thus, even if used in an open system for a long period, its properties are not nearly changed and it can be stored for a long period.

Third, it can be formed as a uniform film of 200Å to 5 μm using p-chlorophenol as a solvent. Thus, it is specifically useful for manufacturing a ferroelectric liquid crystal display device, whereby thinner orientation films make for better bistability properties.

Fourth, since it is used for the orientation film as a single system, it is easy to evaluate the affect of the interaction between the structures of the liquid crystal and the orientation agent on the molecular alignment. Thus, more efficient designs are made possible.

Fifth, a compact film having fewer pin holes or damages is formed and orientation characteristic due to rubbing is excellent so that a twisted nematic (TN) or super twisted nematic (STN) ferroelectric liquid crystal display device having excellent contrast ratio can be manufactured.

Sixth, it shows the characteristics suitable for liquid crystal orientation material, that is, light transmissibility, environmental resistance such as heat-resistance, moisture-resistance or chemical-resistance, adhesiveness to a substrate, capability of forming a uniform thin film, and excellent orientation characteristic by rubbing.

The fully aromatic thermotropic polyester is dissolved in purified p-chlorophenol solution in an appropriate concentration (3wt %) and then is coated on a substrate whereon a transparent conductive layer is coated. Thereafter, the solution is removed by heat treatment at 150° C., to then obtain a fully aromatic thermotropic polyester orientation film having a thickness of 200Å to 5 μm.

The thus-formed orientation film is formed as a uniform film having a few pin holes or damages and is stable against oxygen in the air, moisture or chemicals. Particularly, the adhesiveness to the substrate is excellent and the cracks due to heat or external stress are not nearly generated.

The liquid crystal display device according to the present invention containing such an orientation film can also be manufactured by a conventional method.

Hereinbelow, the present invention will be described in more detail with reference to the following embodiments in case where Ar in general formulae (I) and (II) is methylphenyl in the first step, for example.

EXAMPLE 1

(Synthesis of a fully aromatic thermotropic polyester) 1) Bis(4-hydroxymethylphenyl) terephthalate (BHT) synthesis 0.123 mol of methylhydroquinone (15.27 grams) was dissolved in 25 ml of pyridine and 75 ml of THF in a nitrogen atmosphere and the solution was cooled to 5° C. in an ice bath. Thereafter, 0.025 mol (5 g) of terephthaloyl chloride (TP) dissolved in 25 ml of THF was slowly dropped into the mixed solution. The reaction mixture was stirred at room temperature for 24 hours and an appropriate amount of HCl solution of 2N was added thereto. Then, the reaction mixture was poured in aqueous solution of 65° C. The resulting solid precipitate was filtered to then be separated. The separated solid precipitate was dissolved in an acetone solvent of a minimum amount, filtered with aqueous solution and then re-precipitated and dried in a vacuum at 50° C. to obtain bis(4-hydroxymethylphenyl) terephthalate (BHT), a yellowish solid compound, at a yield of 75%.

NMR and IR analysis was performed with respect to this compound, with the following results.

$^1$H-NMR (acetone-$d_6$): (ppm) 2.15, 2.22, 2.30 (6H, s, $CH_3$), 2.39 (2H, brs, OH), 6.70~7.09 (6H, m, aromatic), 8.32, 8.38 (4H, s, aromatic)

IR (KBr pellet, cm$^{-1}$): 3424 (OH stretch), 2961, 2949, 2928 (CH stretch), 1736, 1713 (C=O stretch), 1510 (C=C aromatic stretch)

2) BHT-TP synthesis 2.6 mmol of the BHT obtained in the BHT synthesis step was dissolved in 15 ml of 1,1,2,2-tetrachloroethane (TCE) and 5 ml of pyridine. Meanwhile, 1.3 mmol of terephthaloyl chloride (TP) was dissolved in 15 ml of TCE, and the solution was added dropwisely to the BHT solution under a nitrogen atmosphere with stirring for 24 hours. The reaction mixture was poured into 400 ml of acetone, stirred for two hours, filtered and dried in a vacuum, to yield BHT-TP polymer. FIG. 1 shows the IR spectrum of BHT-TP, and Table 1 below shows the various other characteristics.

3) BHT-TP/BHT-IP copolymer synthesis

Figure 2:
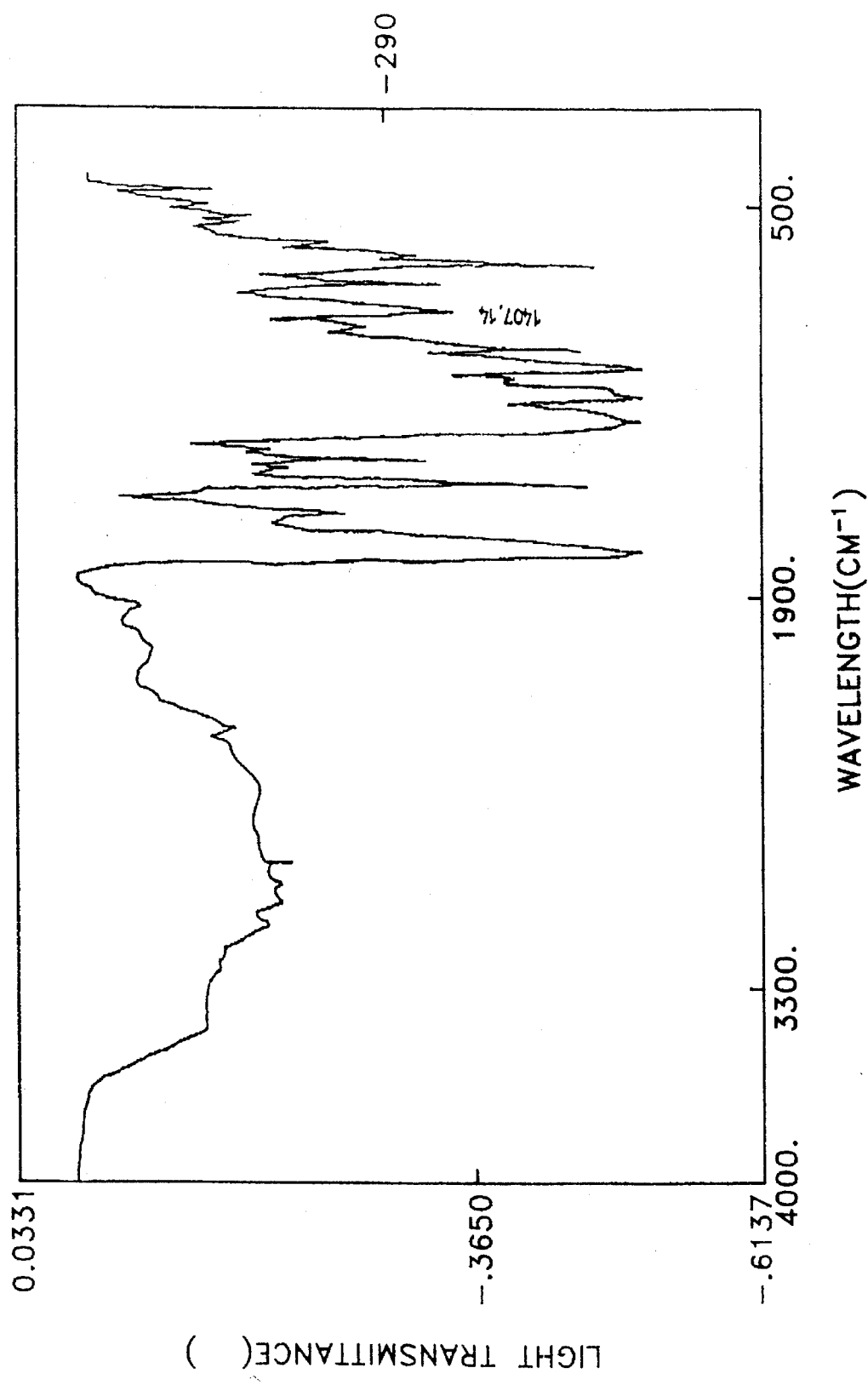
FIG. 2 is an infrared (IR) spectral diagram of a fully aromatic polyester copolymer (BHT-TP/BHT-IP) formed according to another embodiment of the present invention.

The same process as described in the BHT-TP synthesis step was performed, except that 1.3 mmol of IP dissolved in 15 ml of TCE were used together with TP, to thereby obtain BHT-TP/BHT-IP copolymer. The IR spectrum and various other properties were measured with respect to the polyester copolymer. FIG. 2 is the IR spectrum of BHT-TP/BHT-IP copolymer. FIGS. 1 and 2 show similar IR-spectrum characteristics, by which it is known that the synthesized fully aromatic thermotropic polyester has an appropriate light transmittance as an orientation film.

Figure 3:
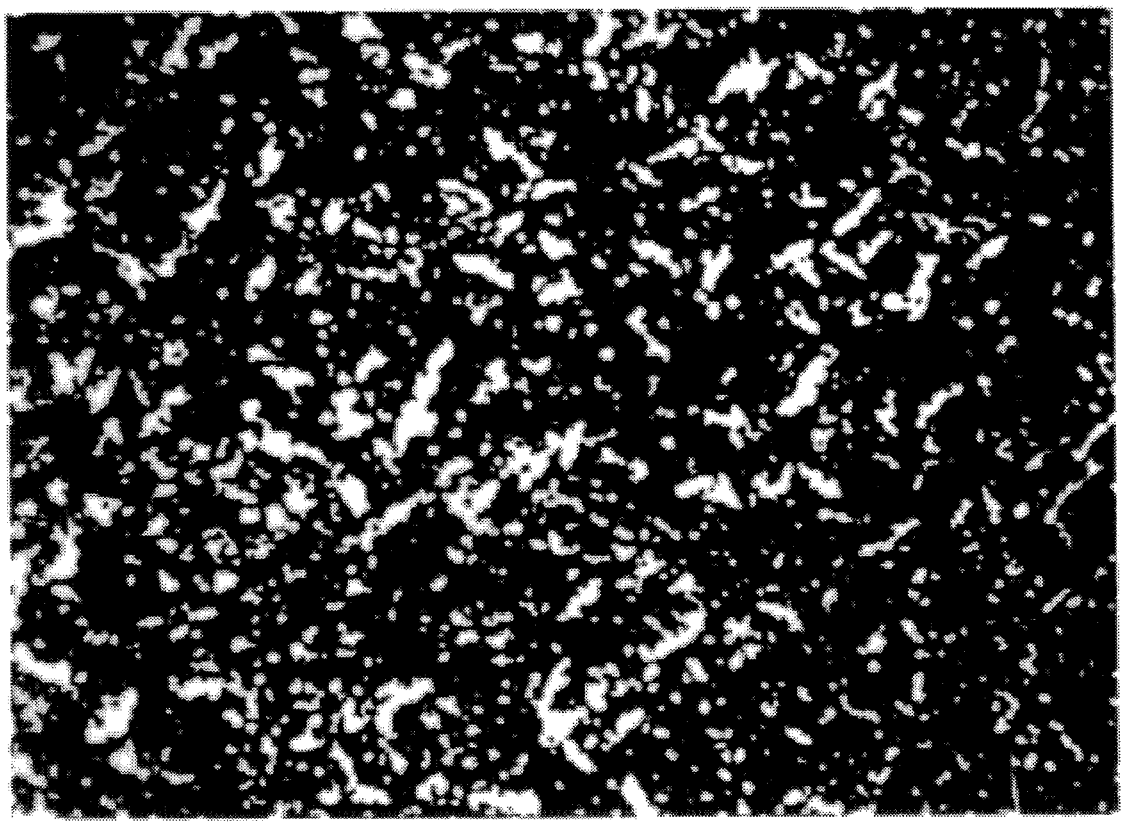
FIG. 3 is a photograph taken by a polarizing microscope of a fully aromatic polyester copolymer (BHT-TP/BHT-IP) shown in FIG. 2.

FIG. 3 is a photograph taken by a polarizing microscope of this copolymer and shows the characteristics of the thermotropic polyester, from which it was confirmed that the polyester was dispersed uniformly during heating at 280°–300° C.

Figure 4:
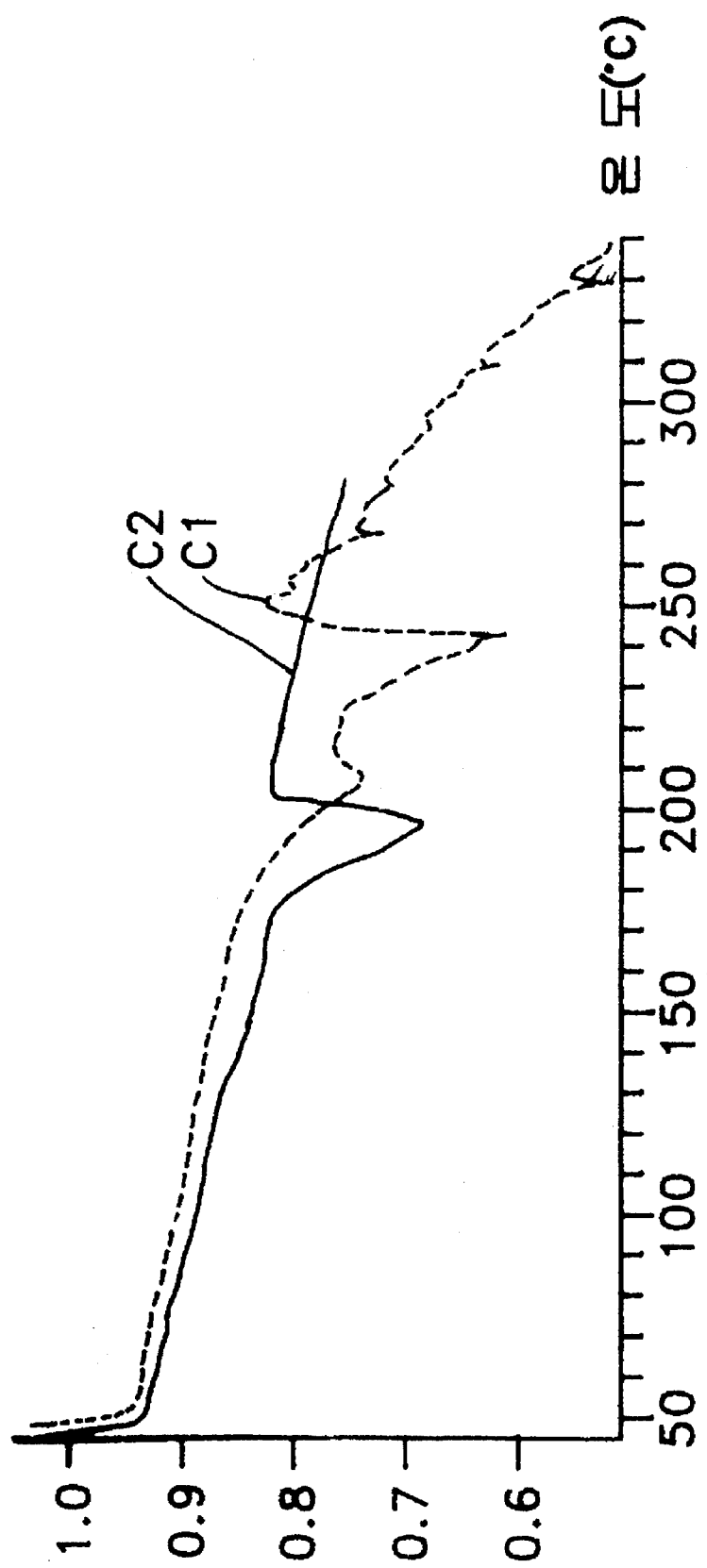
FIG. 4 is a graph showing a differential scanning calorimetry (DSC) curve of a fully aromatic polyester copolymer (BHT-TP/BHT-IP) shown in FIG. 2.

FIG. 4 is a graph showing a differential scanning calorimetry (DSC) curve of the BHT-TP/BHT-IP copolymer and shows that the thermotropic properties exhibited at 208°–240° C. in a calorimetric curve C1 at the time of cooling after heating and the thermotropic properties exhibited at 180°–200° C. in a calorimetric curve C2 at the time of cooling after second heating. As stated above, various property values are indicated in the following Table 1.

TABLE 1

| polymer | monomer | viscosity | Tg | Tm | texture |
| --- | --- | --- | --- | --- | --- |
| BHT – TP | BHT + TP | 1.53 dl/g | 260° C. | 370° C. | nematic |
| BHT – TP/BHT – IP | BHT + TP + IP | 0.86 dl/g | 208° C. | 241° C. | nematic |

EXAMPLE 2

1) Orientation film coating and baking

Purified, fully aromatic thermotropic polyester copolymer (BHT-TP/BHT-IP) was dissolved in p-chlorophenol at a concentration of 3wt %. This solution was spin-coated on upper and lower substrates having a transparent conductive layer coated thereon, by a method for manufacturing a conventional liquid crystal display device. The solvent was completely removed by heat treatment for ten minutes in a vacuum oven of 150° C.

2) Orientation treatment and substrate sealing

The orientation film formed on the upper and lower substrates in the above orientation film coating and baking step was rubbed by a typical rubbing method. Thereafter, a sealant was printed on one of the substrates and a spacer of 1.5 μm was dispersed for spacing cells. The upper and lower substrates were sealed and uniform pressure was applied thereto with heating so that the sealant was cured to complete a void cell.

3) Liquid crystal injection and electro-optical property measurement

T-250 liquid crystal manufactured by Hoechest was injected to the void cell in an isotropic phase and cooled to room temperature at a rate of 1° C. per minute. Then, the orientation state was observed under a cross nicol. A bipolar pulse of 60 Hz frequency, 64 μs pulse width and 20 V pulse height were applied to evaluate bistability.

Figure 6A:
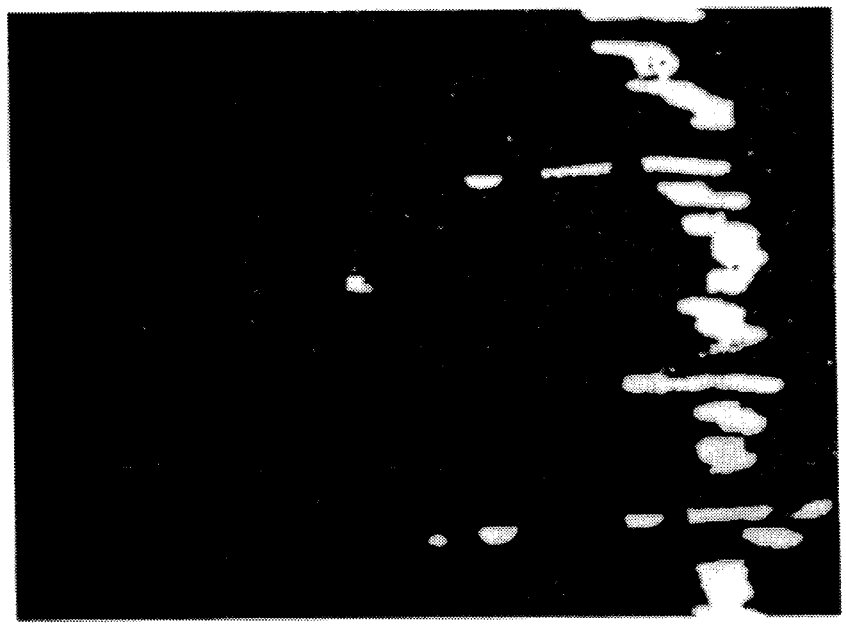
Figure 6B:
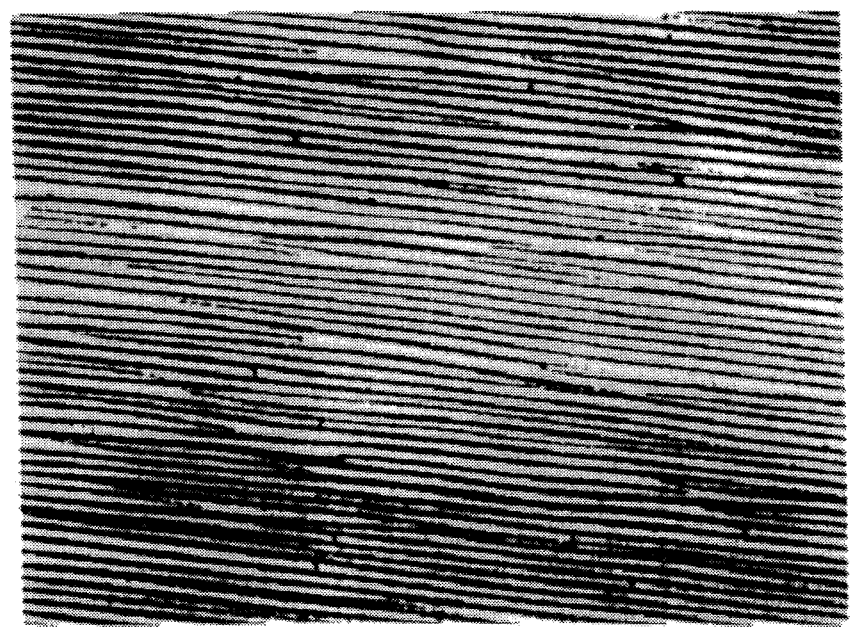
Figure 7:
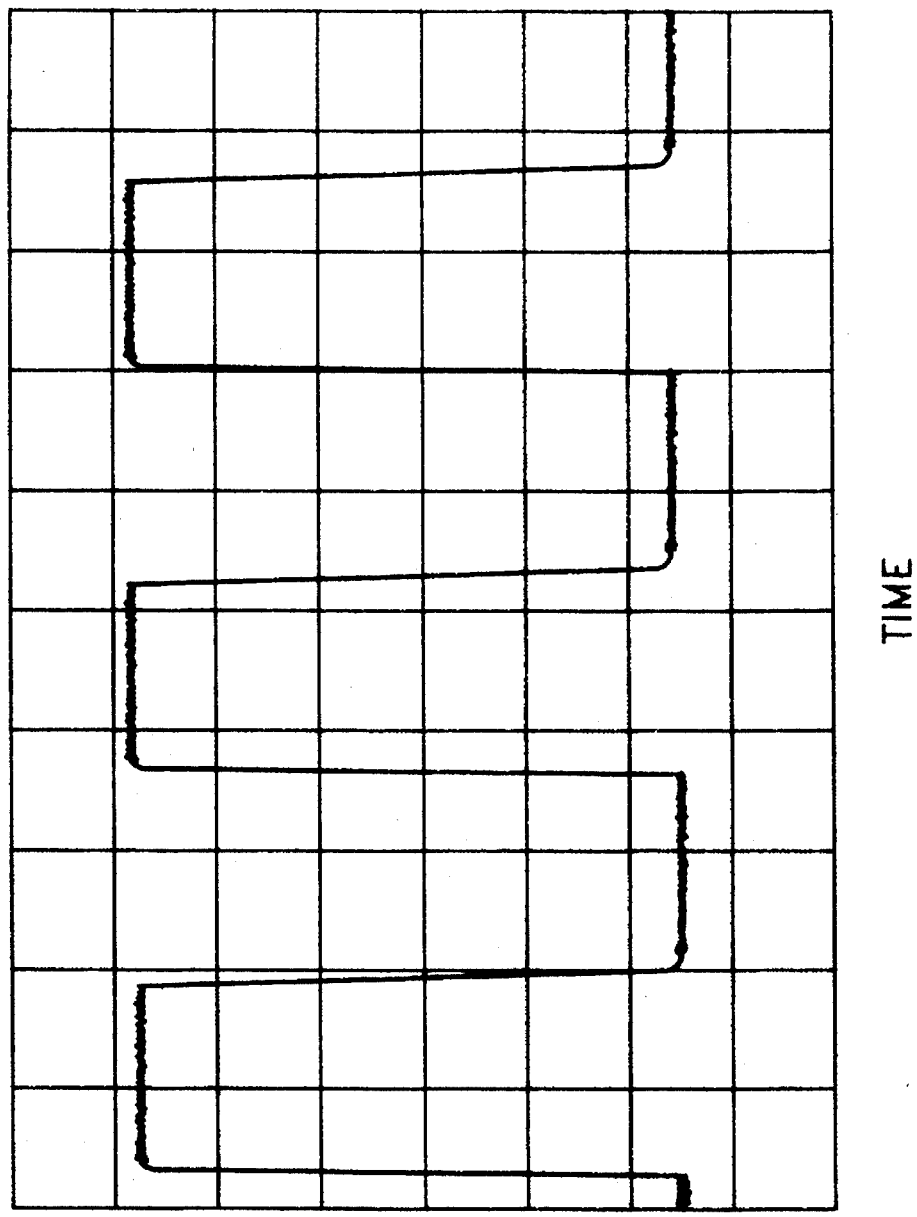
FIG. 7 shows optical characteristics under an electric field where pulse height is +20 V, pulse width is 50 μs and frequency is 60 Hz in the liquid crystal orientation state of the liquid crystal display device shown in FIGS. 6A and 6B.

FIG. 6 shows that liquid crystal display device adopting the copolymer as the orientation film has uniform orientation properties. The bistability is clearly shown in FIG. 7.

COMPARATIVE EXAMPLE

Figure 5A:
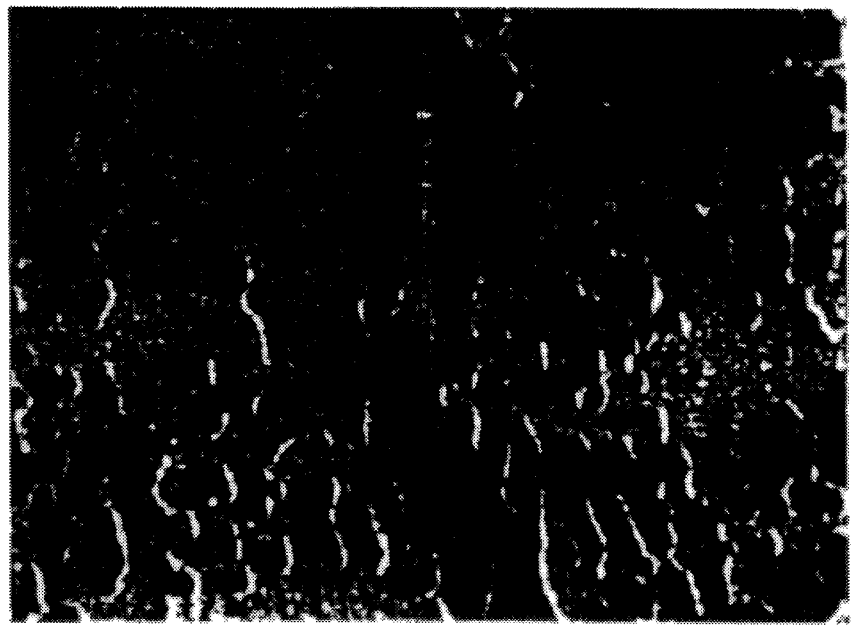
Figure 5B:
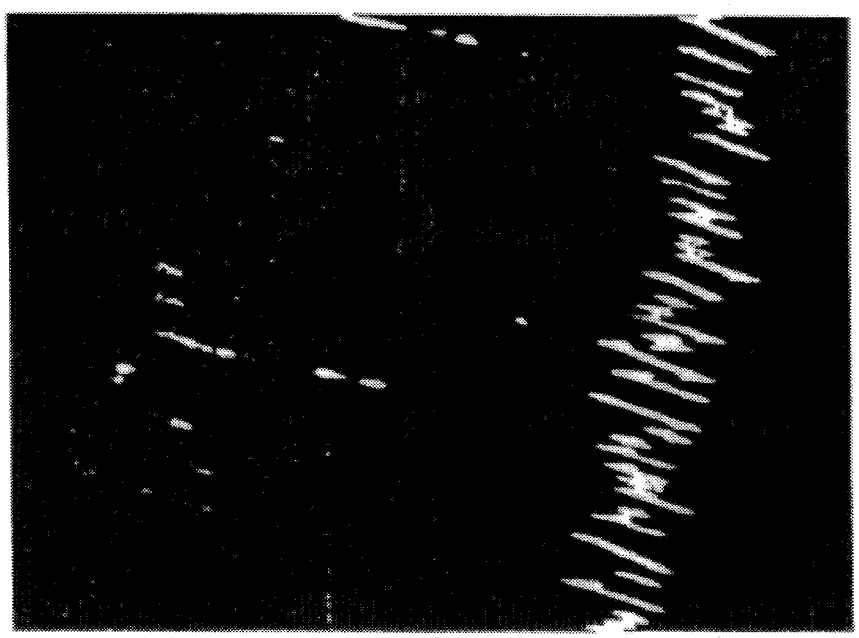

RN-715 manufactured by Nissan Chemicals Industries was used as the orientation material. RN-71S was diluted to 3.0wt % using a mixed solvent of RN-715 NMP and butylcellosolve (weight ratio 75:25), spin-coated at 3000rpm for twenty seconds, pre-dried at 80° and baked at 260° C. for sixty minutes. Then, rubbing treatment was carried out and a void cell was manufactured in the same manner as described in Example 1. T-250 liquid crystals manufactured by Hoechest were injected to the void cell in an isotropic phase and heat-stabilized and electric field stabilized, to measure the electro-optical properties. The results thereof are indicated in FIG. 5, wherein it is understood that the orientation state is not uniform and much defects exist.

As described above, since the liquid crystal display device according to the present invention employs as the orientation film, a new fully aromatic thermotropic polyester having a similar structure as that of a low-molecular weight liquid crystal material, the liquid crystals, orientation film material and orientation characteristics can be easily controlled and the display characteristics and productivity of devices are greatly improved.

What is claimed is:

1. A liquid crystal display device comprising:

a pair of upper and lower substrates;

electrodes each formed on said respective substrates;

orientation films each formed on said respective electrodes and rubbed in a predetermined direction; and liquid crystals injected between said orientation films, wherein said orientation films comprises a fully aromatic thermotropic polyester copolymer represented by the formula (II):

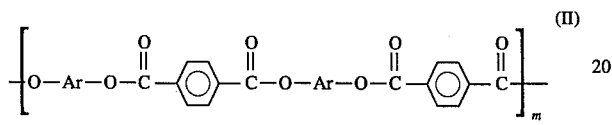

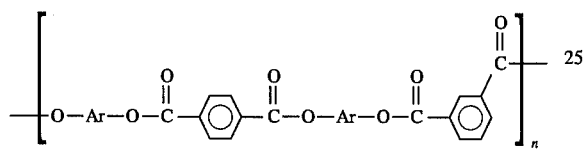

where Ar is an aromatic group, and m and n are positive integers.

2. A liquid crystal display device as claimed in claim 1, wherein said aromatic group is selected from the following group:

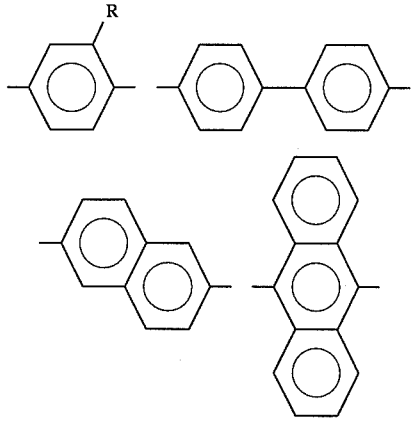

where R is selected from the group consisting of halogen, $CH_{2-x}H$, $CH_3$ and hydrogen, and x is an integer from 0 to 10.

* * * * *